Oct. 27, 1970          P. H. PEGRAM          3,536,292
VALVES FOR CONTROLLING THE FLOW OF FLUIDS
Filed April 3, 1968          2 Sheets-Sheet 1

United States Patent Office 3,536,292
Patented Oct. 27, 1970

3,536,292
VALVES FOR CONTROLLING THE
FLOW OF FLUIDS
Philip Hugh Pegram, Leamington Spa, England, assignor to The Dunlop Company Limited, London, England, a corporation of Great Britain
Filed Apr. 3, 1968, Ser. No. 718,566
Claims priority, application Great Britain, Apr. 6, 1967, 15,854/67
Int. Cl. F16k 31/40
U.S. Cl. 251—30                                8 Claims

ABSTRACT OF THE DISCLOSURE

An on/off valve for controlling a flow of fluid, wherein the fluid is employed to act on a first end of a main valve member to hold it in a position in which the valve is closed, and a pilot valve member is arranged to be operable to release the fluid pressure acting on the said first end of the main valve member and to prevent further flow of fluid thereto in order to allow the main valve member to move to a position in which the valve is open.

---

This invention relates to valves for controlling the flow of fluids, and particularly, but not exclusively, to electromagnetically operated valves for hydraulic systems.

One object of the invention is to provide a compact valve which can be operated by a relatively small electromagnetic actuating force to control a valve opening of relatively large dimensions.

According to the invention, a valve comprises an inlet and an outlet between which a movable main valve member and a main valve seat are interposed, a passage for supplying fluid under pressure from the inlet to the rear of the main valve member to press it against its seat, and a movable pilot valve member arranged to control the pressure of fluid at the rear of the main valve member, the pilot valve member being arranged to open or close two valve ports comprising a first valve port which is arranged when closed to retain pressure behind the main valve member to urge the main valve member towards the closed position, and a second valve port which is arranged to be closed when the first port is opened substantially to prevent the flow of fluid from the inlet to the rear of the main valve member.

In one form of valve according to the invention, the first valve port is formed at the rear of the main valve member itself, communicating through the main valve member with the outlet and being arranged to the closed by the movable pilot valve member when the pilot valve member is moved towards the main valve member, the second valve port consisting of an opening through which fluid can pass from the inlet to the rear of the main valve member and which is arranged to be closed by the pilot valve member when the pilot valve member is moved away from the main valve member.

In another form of valve according to the invention the first valve port is a fixed port formed in a chamber which communicates with the rear of the main valve member, the first valve port communicating with the outlet and being arranged to be closed by movement of the pilot valve member, the second valve port being arranged as defined in the preceding paragraph.

Several embodiments of the invention will now be described, by way of example with reference to the accompanying drawings in which.

Figures 1, 4:
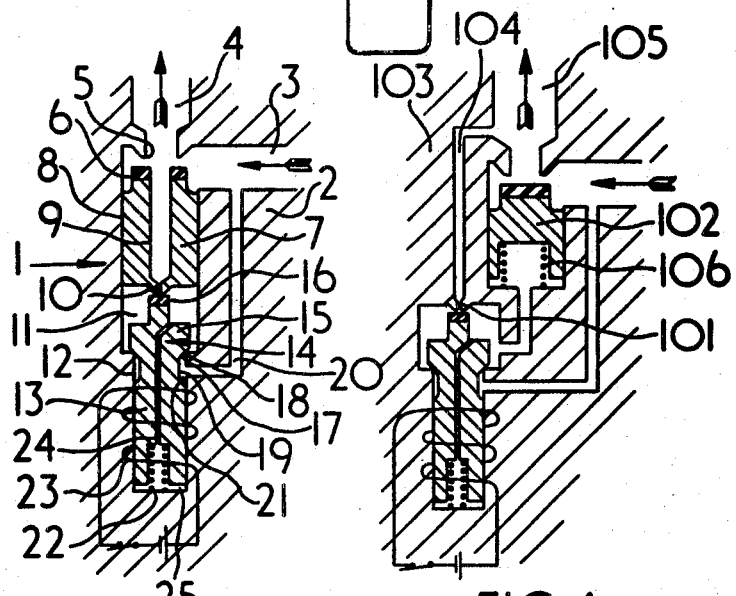
FIG. 1 is a diagrammatic cross-sectional view of a valve in accordance with the invention.
FIG. 4 is a diagrammatic cross-sectional view of an alternative valve in accordance with the invention.

The valve 1 illustrated diagrammatically in FIG. 1 is a solenoid valve for controlling the flow of fluid in a hydraulic system and comprises a housing 2 having an inlet 3 and an outlet 4 disposed at right angles to one another, the outlet 4 having an annular valve seat 5 engageable by an annular rubber sealing disc 6 mounted on a movable main valve member 7 which is fluid-tightly slidable in a bore 8 of the housing axially aligned with the outlet. The main valve member 7 is provided with an axial bore 9 emerging at the rear end of the main valve member to provide a first valve port 10 communicating through the bore 9 with the outlet 4.

At the rear of the main valve member, a chamber 11 is formed in the housing which leads into a smaller-diameter axial bore 12 which forms a continuation of the chamber 11 in a direction axially away from the main valve member 7 and in which the stem 13 of a pilot valve member 14 is fluid-tightly slidable. The head 15 of the pilot valve member 14 is within the chamber 11 and carries at its end a rubber sealing disc 16 for sealing engagement with the first valve port 10. The rear of the head of the pilot valve member is formed with a frusto-conical seating surface 17 which is engageable with a seat 18 formed at the end of the axial bore 12 through the housing, constituting a second valve port. The portion 19 of the stem of the pilot valve member adjacent the head is of reduced diameter, a side passage 20 being provided to allow fluid to pass from the inlet 3 to the space 21 within the axial bore surrounding the reduced-diameter portion 19 of the valve stem 13.

A light coiled compression spring 22 is provided at the end of the pilot valve stem remote from the first valve port 10 to urge the pilot valve member 14 towards the first valve port 10 and a solenoid 23 is mounted in a position in which it surrounds the pilot valve stem and, when energized, will draw the pilot valve member 14 away from the first valve port 10, thus opening the first valve port 10 and closing the second valve port 18. An axial bleed passage 24 is provided in the pilot valve stem to communicate between the chamber 11 and the space 25 at the rear end of the pilot valve member.

In operation, the main valve 7 is normally held closed by the action of the compression spring 22 which presses the sealing disc 16 carried by the pilot valve member against the first valve port 10, urging the main valve member towards its seat 5. With the first valve port 10 closed and the second valve port 18 open fluid pressure from the inlet is allowed to enter the chamber 11 at the rear of the main valve member, thus increasing the pressure with which the main valve member is held against its seat 5.

When the solenoid 23 is operated so as to tend to retract the pilot valve member from engagement with the main valve member, the first valve port 10 is opened and the second valve port 18 is closed, thus enabling the fluid pressure contained in the chamber 11 at the rear of the main valve member to escape through the first valve port 10 to the outlet 4, the closure of the second valve port 18 preventing fluid from entering the chamber 11 from the inlet 3 to re-establish pressure therein. The pressure exerted on the main valve member 7 by the fluid at the inlet 3 then acts to force the main valve member 7 away from its seat 5 and fluid flows from the inlet to the outlet.

Figure 2:
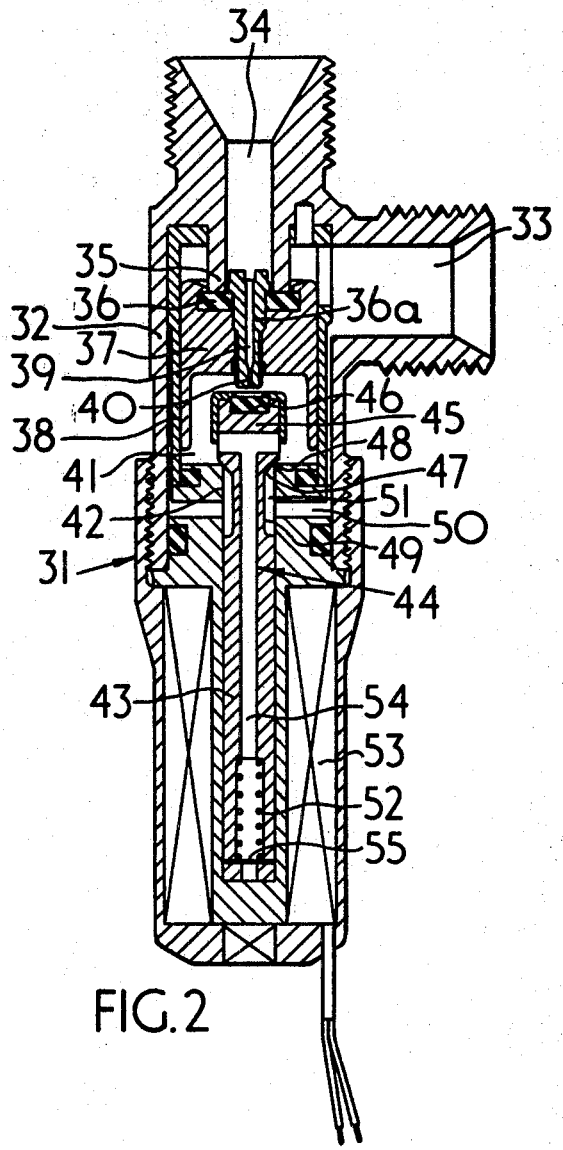
FIG. 2 is an axial cross-sectional view showing one embodiment of the kind of valve illustrated diagrammatically in FIG. 1.

FIG. 2 shows a practical embodiment of the valve described above. The solenoid valve 31 comprises a housing 32 having an inlet 33 and an outlet 34 disposed at right angles to one another, the outlet 34 having an annular valve seat 35 engageable by an annular rubber sealing disc 36 mounted on a movable main valve member 37 which is fluid-tightly slidable in a bore 38 of the housing axially aligned with the outlet. The rubber sealing disc 36 is held in position on the main valve member by a screw 36a which is secured in and passes axially through the main valve member and is itself provided with an axial bore 39, one end of the screw projecting from the rear end of the main valve member to provide a first valve port 40 communicating through the bore 39 in the screw with the outlet 34.

At the rear of the main valve member, a chamber 41 is formed in the housing which leads into a smaller-diameter axial bore 42 which forms a continuation of the chamber 41 and in which the stem 43 of a pilot valve member 44 is fluid-tightly slidable. The head 45 of the pilot valve member carries at its end a rubber sealing disc 46 for sealing engagement with the first valve port 40. The rear of the head of the pilot valve member is formed with a frusto-conical seating surface 47 which is engageable with a seat 48 formed at the end of the bore 42 constituting a second valve port. The portion 49 of the stem of the pilot valve member adjacent the head is of reduced diameter, a side passage 50 being provided to allow fluid to pass from the inlet 33 to the space 51 within the axial bore surrounding the reduced-diameter portion of the valve stem 43.

A light coiled compression spring 52 is provided at the end of the pilot valve stem 43, and a solenoid 53 surrounds the pilot valve stem. An axial bleed passage 54 is provided in the pilot valve stem to communicate between the chamber 41 and the space 55 at the rear end of the pilot valve member.

The operation of the valve 31 is as described above with reference to the valve 1.

Figure 3:
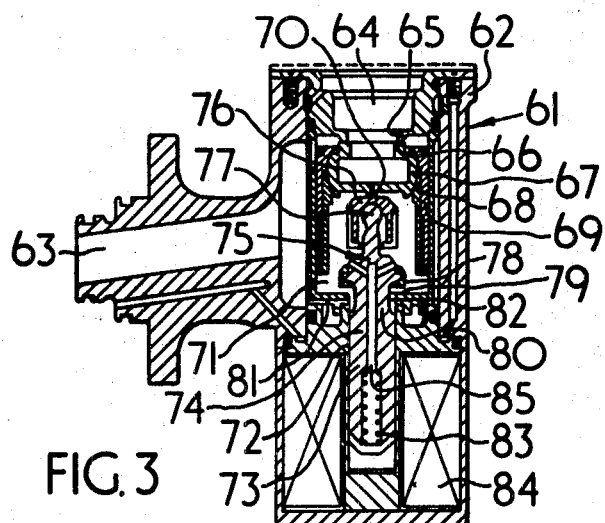
FIG. 3 is an axial cross-sectional view showing an alternative embodiment of the kind of valve illustrated in FIG. 1.

FIG. 3 shows a second embodiment of the invention, which operates on the same principle but which is specially adapted for use with liquids for which rubber sealing discs cannot be employed, the main valve member and the pilot valve member being constructed wholly of metal. In the valve 61 shown in FIG. 3 the housing 62 has an inlet 63 and an outlet 64. The outlet 64 has an annular valve seat 65 which is engageable by a seating portion 66 formed on the forward end of a part-spherical member 67 which is universally movably mounted in a spherical seating 68 formed in a piston 69 which constitutes the main valve member. The rear of the member 67 is drilled to provide a first valve port 70 communicating with the outlet 64.

A chamber 71 is formed in the housing 62 which leads into an axial bore 72 in which the stem 73 of a pilot valve member 74 is fluid-tightly slidable. The head 75 of the member 74 comprises a metal block 76 mounted on a ball joint 77 at the end of the stem 73 and having a flat forward surface for sealing engagement with the first valve port 70.

The rear portion of the head 75 of the pilot valve member is provided with an annular metal sealing ring 78 which is engageable with a second valve port 79 formed at the end of the bore 72. The portion 80 of the stem 73 is of reduced diameter, a side passage 81 being provided to enable fluid to pass from the inlet 63 to the space 82 around the portion 80.

A spring 83 is provided at the end of the stem 73 and a solenoid 84 surrounds the stem 73 which includes an axial bleed passage 85.

The operation of the valve 61 is as described above with reference to the valves 1 and 31.

The effect of making the seating portions of both the main valve member and the pilot valve member of the valve 61 universally movable is to ensure that they can both move to correct alignment and provide satisfactory metal-to-metal seals.

In a third embodiment illustrated diagrammatically in FIG. 4, the first valve port 101 is not formed on the main valve member 102 but is formed in the housing 103 and communicates through a drilling 104 with the outlet 105. In this embodiment the arrangement and the operation of the parts of the valve is otherwise similar to that of the valves described above and will not be described in detail, but it is necessary to provide an additional return spring 106 for the main valve member to move it to its closed position when insufficient fluid pressure is available to close it.

The valves described above have the advantage that they provide self-servo actuation and are suitable for use either for pneumatic or hydraulic fluids since they do not require fluid to be vented, other than to the outlet. The second valve port functions to isolate the chamber behind the main valve member from the pressure supply whenever the first valve port is open, and this enables a very small opening to be provided in the first valve port since when it is closed the rate of flow of fluid into the chamber is reduced to a negligible amount. As a consequence of this, the valve can be operated by a very small electromagnetic thrust, and a further advantage is that servo actuation is effective even with a very low pressure supply. Further, it is not necessary to provide rubber seals for the main valve member or the pilot valve member, thus reducing friction to a minimum.

The valves described above have the further advantage that they enable a large flow of fluid or pneumatic pressure to be controlled by a valve of relatively small physical dimensions.

Although the present invention has been illustrated and described in connection with certain selected example embodiments it will be understood that these are illustrative of the invention and are by no means restrictive thereof. It is reasonable to be expected that those skilled in this art can make numerous revisions and adaptations of the invention and it is intended that such revisions and adaptation will be included within the scope of the following claims as equivalents of the invention.

What I claim is:

1. A valve comprising an inlet and an outlet between which a movable main valve member and a main valve seat are interposed, a passage for supplying fluid under pressure from the inlet to the rear of the main valve member to press it against said seat, an axially movable pilot valve member having a head portion comprised of a block arranged to control the pressure of fluid at the rear of the main valve member, the pilot valve member being arranged to open or close two valve ports comprising a first valve port in communication with said outlet and which is arranged when closed to retain pressure behind the main valve member to urge the main valve member toward its closed position, and a second valve port which is arranged to be closed when the first valve port is opened substantially to prevent the flow of fluid from the inlet to the rear of the main valve member, the head portion of said pilot valve member and the main valve member being constructed solely of metal, said pilot valve member having a valve stem including a ball joint at the end thereof with said metal block mounted on said ball joint and having a flat surface for engagement with said first valve port located at the rear of said main valve member.

2. A valve according to claim 1 wherein the first valve port is formed in the main valve member and communicates through the main valve member with the outlet and is arranged to be closed by the movable pilot valve member when the pilot valve member is moved towards the main valve member, the second valve port comprising an opening through which fluid can pass from the inlet to the rear of the main valve member and which is arranged to be closed by the pilot valve member when the pilot valve member is moved away from the main valve member.

3. A valve according to claim 1 wherein resilient means is provided to urge the pilot valve member towards a position in which it closes the first valve port.

4. A valve according to claim 1 wherein electromagnetic means is provided to actuate the pilot valve member.

5. A valve according to claim 4 wherein the electromagnetic means comprises a solenoid surrounding a stem portion of the pilot valve member.

6. A valve according to claim 5 wherein resilient means in the form of a coiled compression spring is provided at the end of the pilot valve member remote from the first valve port to urge the pilot valve member towards the first valve port.

7. A valve according to claim 1 wherein the pilot valve member has a stem portion which is axially slidable in a bore of a housing and has a head portion contained in a chamber of the housing for engagement with the first valve port, the rear of the head of the pilot valve member being formed with a seating surface engageable with a seat formed at the end of the housing bore to constitute the second valve port, the passage for supplying fluid under pressure from the inlet to the rear of the main valve member being arranged to enter the housing bore and the arrangement being such that fluid under pressure can flow through the bore and the second valve port into the chamber only when the second valve port is open.

8. A valve according to claim 1 wherein the main valve member comprises a piston fluid-tightly slidable in the valve housing and having a hollow part-spherical member movably mounted in a spherical seating therein to form the central portion of the piston crown, the forward end of the part-spherical portion providing a seating portion engageable with the main valve seat.

References Cited

UNITED STATES PATENTS

| | | | |
|---|---|---|---|
| 2,968,464 | 1/1961 | Olson | 251—25 X |
| 3,351,316 | 11/1967 | Lewis et al. | 251—30 |
| 2,650,616 | 9/1953 | Wilkinson et al. | 251—30 |
| 2,710,162 | 6/1955 | Snoddy | 251—30 X |

ARNOLD ROSENTHAL, Primary Examiner

U.S. Cl. X.R.

251—86